(12) United States Patent
Miller et al.

(10) Patent No.: US 6,834,741 B2
(45) Date of Patent: Dec. 28, 2004

(54) ENGINE COVER WITH INTERNAL VIBRATION DAMPING PLATES

(75) Inventors: Alan S. Miller, Farmington Hills, MI (US); Paolo Comello, Brampton (CA)

(73) Assignees: General Motors Corporation, Detroit, MI (US); Tesma Engine Technologies, Concord (CA)

( * ) Notice: Subject to any disclaimer, the term of this patent is extended or adjusted under 35 U.S.C. 154(b) by 98 days.

(21) Appl. No.: 10/396,767

(22) Filed: Mar. 24, 2003

(65) Prior Publication Data

US 2004/0188165 A1 Sep. 30, 2004

(51) Int. Cl.[7] .............................................. F02B 77/00
(52) U.S. Cl. .................................. 180/313; 123/198 E
(58) Field of Search .............................. 180/291, 313, 180/84; 123/198 E, 195 C

(56) References Cited

U.S. PATENT DOCUMENTS

| | | | | |
|---|---|---|---|---|
| 1,737,466 A | * | 11/1929 | Lynd | 184/106 |
| 3,822,763 A | * | 7/1974 | Adams et al. | 181/204 |
| 4,066,058 A | * | 1/1978 | Anderkay | 123/198 E |
| 4,202,311 A | * | 5/1980 | Moriyoshi | 123/195 C |
| 4,369,744 A | * | 1/1983 | Kubozuka et al. | 123/198 E |
| 4,394,853 A | * | 7/1983 | Lopez-Crevillen et al. | 123/195 C |
| 5,375,569 A | * | 12/1994 | Santella | 123/90.38 |
| 5,544,632 A | * | 8/1996 | Choate | 123/195 C |
| 6,561,312 B2 | * | 5/2003 | Stanienda | 181/207 |

FOREIGN PATENT DOCUMENTS

JP 10-231897 * 9/1989

\* cited by examiner

Primary Examiner—Bryan Fischmann
(74) Attorney, Agent, or Firm—Leslie C. Hodges

(57) ABSTRACT

A cover assembly for an engine includes at least one relatively large mounting wall portion potentially subject to induced vibrations that transmit undesirable noise or sound to the exterior of the engine. To reduce the vibration and resulting noise, a pair of vibration damping plates is attached to the interior of the mounting wall portion and urged against the wall portion. The damping plates may be made from untreated steel when mounted in a lubricating oil atmosphere which serves to protect the plates against oxidation. The plates have different thicknesses selected to provide differing vibration frequency responses that act to create damping between the plates and the associated cover wall portion.

12 Claims, 2 Drawing Sheets

ENGINE COVER WITH INTERNAL VIBRATION DAMPING PLATES

TECHNICAL FIELD

This invention relates to engine covers and, more particularly, to engine covers with internally-mounted vibration damping plates for noise reduction.

BACKGROUND OF THE INVENTION

It is known in the art relating to engine covers to attach vibration damping plates or stiffeners to selected wall portions of the covers as needed to limit the occurrence of sound transmitting vibrations induced in the covers by operating components of the engine. The application of such damping means has generally been accomplished after design of the basic cover and the damping materials are commonly applied to the cover exterior. This allows the use of materials which could not be used in contact with hot engine oil, but it exposes the damping materials to external air, moisture and dirt which may cause deterioration of the damping materials during extended service of an associated vehicle. Sandwich-type damping materials can be utilized but must undergo time consuming durability testing to determine their potential for satisfactory service over the life of a vehicle.

SUMMARY OF THE INVENTION

The present invention provides a cover assembly for an engine wherein the cover preferably encloses a compartment in which lubricating oil and/or oil vapors are contained and wherein the cover includes at least one relatively large wall portion which is potentially subject to induced vibrations that transmit undesirable noise or sound to the exterior of the engine. To reduce the vibration and resulting noise generation of the vibration susceptible wall portions, called for convenience mounting wall portions, vibration damping plates are attached to the interior of the mounting wall portion or portions of the cover. The damping plates may be made from untreated steel since the lubricating oil atmosphere serves to protect the plates against oxidation. However, if desired, the plates may be coated or otherwise protected from oxidation and applied in cover locations wherein lubricating oil is not available for protection of the plate materials.

A preferred damping assembly at each location comprises a pair of associated damping plates, including a first damping plate having a surface directly engaging a substantial part of one of the mounting wall portions and a second damping plate having a surface directly engaging a substantial part of the first damping plate. The pair of damping plates are mechanically fastened together and to the interior of the mounting wall portion of the cover at a plurality of common fastening locations. The plates have different thicknesses with diverse vibration frequencies that are adapted to offset or reduce vibrations in the mounting wall portions of the cover over a range of engine speeds.

In a preferred embodiment, a cover assembly is designed to cover operating mechanisms of the engine. For example, the cover may be a front engine cover which encloses a timing chain drive for connecting the crankshaft with sprockets provided for driving associated overhead camshafts of an engine. Such a cover may have multiple mounting wall portions from which vibration-generated sound may be transmitted so that damping assemblies may be located at each of the mounting wall portions.

The damping assemblies preferably include a pair of damping plates having differing thicknesses and secured to the cover mounting wall portions by suitable fastening means. A preferred arrangement for an aluminum cover is to provide cast in mounting posts on which are received openings in the pairs of damping plates to secure the plates to the cover at several peripheral locations. The plates are preferably provided with upwardly angled spring portions at each of the fastening openings, and these spring portions are engaged by ends of the mounting posts, deformed by any suitable method to create heads. Each pair of plates is thus held against the associated surface of the cover with a spring bias which maintains the plates and the cover in engagement with one another and allows vibrations in the plates and cover to be damped by relative motion of the plates and cover in an oil containing atmosphere.

In an exemplary embodiment, a first plate adjacent the cover is supported by a second plate which is retained by the retainer means. The second plate is preferably thicker that the first plate, the thicknesses of the damping plates having a ratio in the range of from about 5/4 to 2/1 or, in a described embodiment, a ratio of 3/2.

These and other features and advantages of the invention will be more fully understood from the following description of certain specific embodiments of the invention taken together with the accompanying drawings.

DESCRIPTION OF THE PREFERRED EMBODIMENT

Figure 1:
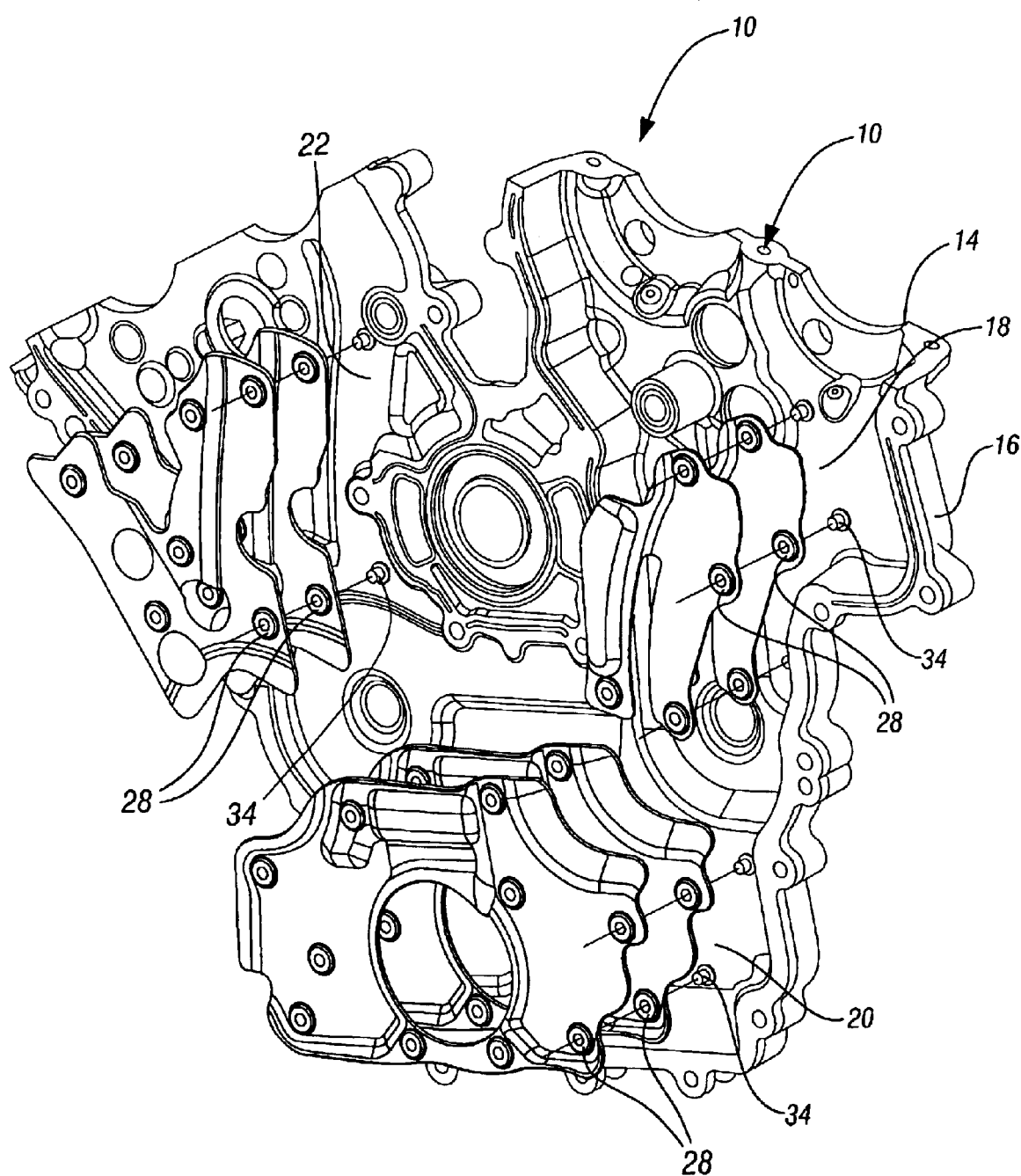
FIG. 1 is an exploded pictorial view of a front engine cover assembly for enclosing a lubricated camshaft chain drive mechanism and other components and showing the application of associated pairs of damping plates to mounting wall portions of the cover.

Referring first to FIG. 1 of the drawings in detail, numeral 10 generally indicates an exemplary front cover assembly for an engine having an overhead camshaft chain drive, not shown. The cover is adapted to enclose a lubricated chain drive of the engine and associated components in a compartment in which oil lubricant is present as liquid or vapor in the atmosphere within the compartment. Assembly 10 includes a relatively large cast aluminum cover 12 having peripheral edges 14 and flanges 16, which are mountable against a cylinder block or other mounting surface of an engine, not shown. Within the peripheral edges 14 and flanges 16, the cover includes a number of mounting devices and openings, not identified, along with three relatively large wall portions 18, 20, 22, called for convenience mounting wall portions. These mounting wall portions include generally flat surfaces as well as some non-flat surface areas which together represent portions of the front cover which are potentially subject to induced vibration and resultant transmission of undesirable sound levels from the cover to the exterior of the engine.

Figure 2:
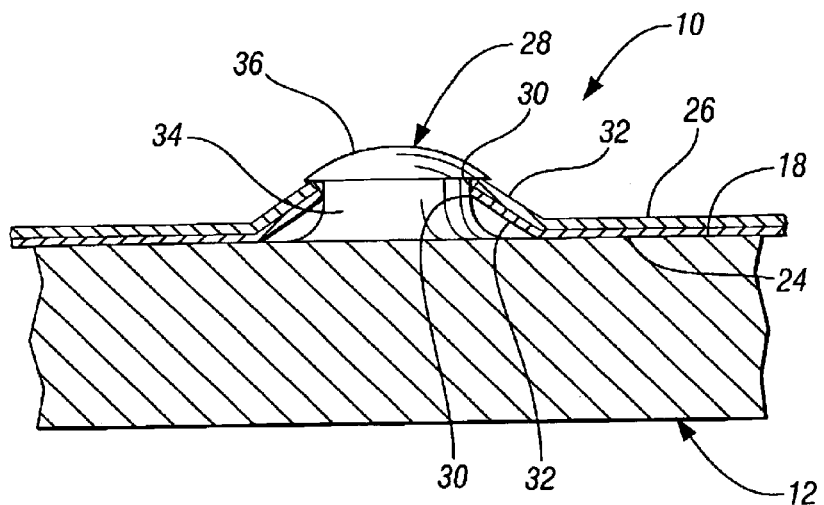
FIG. 2 is a cross-sectional view through one of the pairs of damping plates showing the mounting of the steel plates to a mounting post of an aluminum cover.
Figure 3:
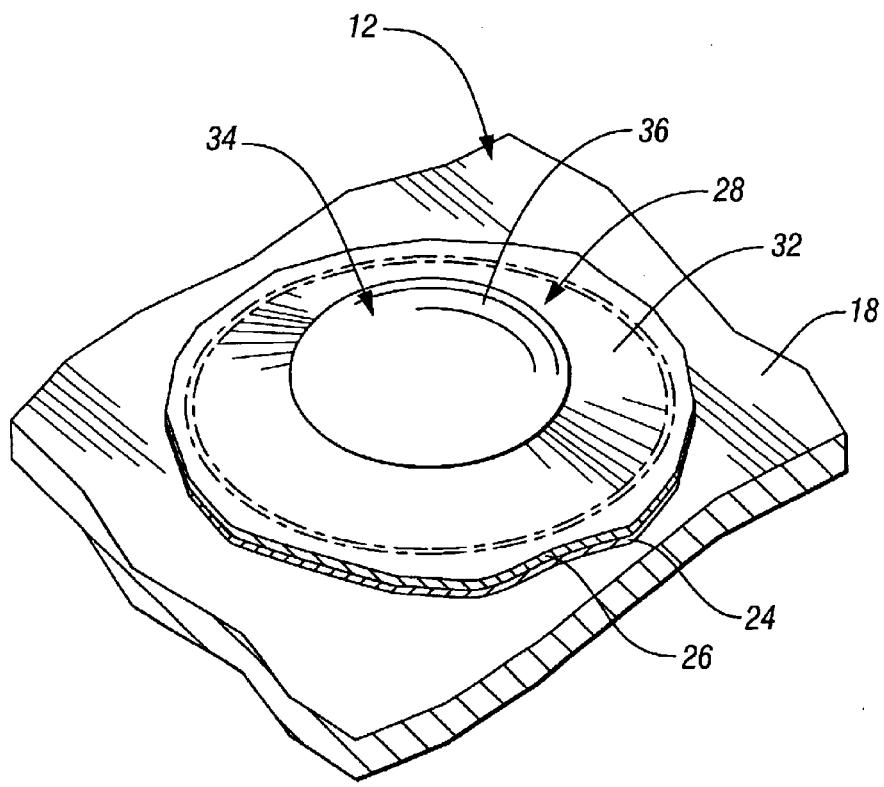
FIG. 3 is a pictorial view of the formed aluminum head on a mounting post shown retaining a mounting plate to the cover at one of the mounting locations.

Referring also to FIGS. 2 and 3, the vibration susceptible mounting wall portions 18, 20, 22 are each provided with a damping assembly 23 made up of a pair of similarly formed first and second damping plates 24, 26. Each first damping plate 24 is mounted directly against the associated mounting wall portion of the cover while the second damping plate 26 is mounted directly on the first damping plate.

At each of a plurality of mounting locations 28 of the exemplary embodiment, each damping plate is provided with a mounting opening 30 surrounded by an outwardly deformed generally conical spring portion 32 connected with the remaining flat or shaped portions of the associated damping plate. At each of the mounting locations, the aluminum cover 12 is provided with a cast in aluminum mounting post 34. In assembly, the first and second damping plates are assembled to the cover with their mounting openings 30 received on the mounting posts 34. The conical spring portions 32 are angled away from the adjacent inner surface of the cover mounting wall portions 18, 20, 22. The damping plates are then attached by deforming the metal at the distal ends of the aluminum mounting posts to form mushroom-like heads 36 which engage the spring portions at the mounting openings 30 of the second damping plate 26, preferably loading the spring portions toward the interior surface of the cover 12, thereby holding the first and second damping plates firmly against one another and against the associated cover mounting wall portion.

Preferably, the first and second damping plates 24, 26 are made from steel of differing thicknesses. For example, in an illustrative embodiment, the first plate 24 is thinner than the second plate 26, which applies a biasing force against the first plate and holds the plate assembly against the cover 12. In this embodiment, the ratio of the thickness of the second damping plate to that of the first damping plate is 3/2; however, the ratios could differ depending on the application, within any reasonable range, for example in a range of from 5/4 to 2/1.

The selection of the size, shape and thickness of the plates is in large measure determined by the particular configuration and other characteristics of the associated cover itself. Thus, the mass of the associated damping assembly 23 is selected to offset the undesirable vibration frequencies which the particular wall portions of the cover are shown to experience during engine operation. The differences in the thicknesses of the associated plates are determined by the range of frequencies of vibration which it is desired to offset. Since the plates of different thicknesses have different natural frequencies, the resonance of the two plates compared to that of the cover wall portion to which the plates are attached creates diverse frequency responses. These have the result of causing relative motion of the two plates with respect to one another and to the associated cover. This motion in the oil-containing atmosphere provides damping of the cover vibrations at the wall portion locations and reduces the radiated sound transmitted from the cover mounting wall portions.

It should be understood that the dual plate assemblies of the invention could be applied to other types of engine covers and could be attached to the covers by other forms of fasteners than the aluminum posts described in connection with the illustrated embodiment. In oil lubricant containing environments, the steel plates are not likely to require protection against rust or oxidation; however, the plates could be made of non-oxidizing steel or protected by coatings if used in environments where rust-preventing lubricant may not be present in adequate amounts.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A cover assembly for an engine, the assembly comprising:
    a cover including peripheral edges and a wall extending between the edges, the wall including at least one vibration-sensitive mounting wall portion and;
    a pair of associated damping plates, including a first damping plate having a flat surface directly engaging a substantial part of the mounting wall portion, and a second damping plate having a flat surface directly engaging a substantial part of the first damping plate;
    the pair of damping plates being mechanically fastened together and to the interior of the mounting wall portion of the cover at a plurality of common fastening locations, the plates having different thicknesses with diverse vibration frequencies adapted to offset or reduce vibrations in the mounting wall portion of the cover over a range of engine speeds.

2. A cover assembly as in claim 1 wherein the second damping plate has a greater thickness than that of the first damping plate.

3. A cover assembly as in claim 1 wherein the fastening locations of the plates include spring portions deformed to urge the plates against one another and the cover.

4. A cover assembly as in claim 1 wherein the plates extend over essentially the same area of the mounting wall portion.

5. A cover assembly as in claim 1 wherein there are a plurality of pairs of damping plates each engaging a mounting wall portion of the cover.

6. A cover assembly as in claim 1 wherein the thicknesses of the associated damping plates have a ratio in the range of from 5/4 to 2/1.

7. A cover assembly as in claim 1 wherein the damping plates are formed of steel and the interior of the cover mounting wall portion is exposed to an oxidation inhibiting lubricant.

8. A cover assembly as in claim 1 wherein the cover is formed of aluminum and includes integral aluminum posts receiving openings in the plates at each of the fastening locations, the plates being secured to the cover by deforming outer ends of the posts against edges of the openings.

9. A cover assembly as in claim 1 wherein the second damping plate has a greater thickness than that of the first damping plate and the fastening locations of the plates include spring portions deformed to urge the plates against one another and the cover.

10. A cover assembly as in claim 9 wherein the cover is formed of aluminum and includes integral aluminum posts receiving openings in the plates at each of the fastening locations, the plates being secured to the cover by deforming outer ends of the posts against edges of the openings, the damping plates are formed of steel and the interior of the cover mounting wall portion is exposed to an oxidation inhibiting lubricant.

11. A cover assembly as in claim 10 wherein the plates extend over essentially the same area of the mounting wall portion and the thicknesses of the associated damping plates have a ratio in the range of from about 5/4 to 2/1.

12. A cover assembly as in claim 11 wherein there are a plurality of pairs of damping plates each engaging a mounting wall portion of the cover.

* * * * *